Figure 1:
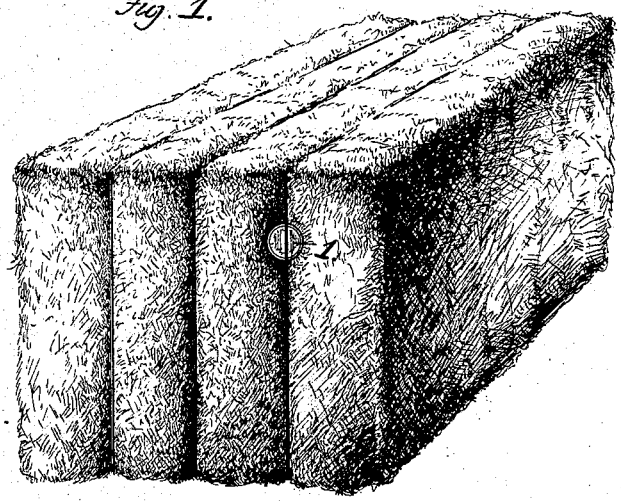

No. 894,595. PATENTED JULY 28, 1908.
H. P. CANNON.
TAG.
APPLICATION FILED JULY 23, 1907.

WITNESSES:
A. H. Rabsag,
Rex N. Butler

INVENTOR
Henry P. Cannon,
BY H. C. Everett Co.
Attorneys

UNITED STATES PATENT OFFICE.

HENRY P. CANNON, OF CANONSBURG, PENNSYLVANIA.

TAG.

No. 894,595.  Specification of Letters Patent.  Patented July 28, 1908.

Application filed July 23, 1907. Serial No. 385,176.

*To all whom it may concern:*

Be it known that I, HENRY P. CANNON, a citizen of the United States of America, residing at Canonsburg, in the county of Washington and State of Pennsylvania, have invented certain new and useful Improvements in Tags, of which the following is a specification, reference being had therein to the accompanying drawing.

This invention relates to tags, and more particularly to tin tags or buttons designed for marking bales of hay, straw, flax, tow, hemp, rags, shavings and excelsior.

The invention has for its object to provide a novel form of tag for designating the weight of the bale in connection with which it is used.

Another object of this invention is the provision of novel means in connection with a metallic tie for easily and quickly securing a tag to a bale of material. To this end, I have devised a simple and inexpensive tag adapted to be used in connection with various types of balers or baling machines, novel means being employed to retain a tag in engagement with the header block of a baling machine, whereby when hay or similar material is pressed or wired, a tag will be affixed to one of the ends of the bale and retained in engagement therewith by one of the wires of said bale.

The detail construction of my improved tag, together with the manner of applying the same to a bale, will be hereinafter more fully described and then specifically pointed out in the appended claims.

Figure 2:
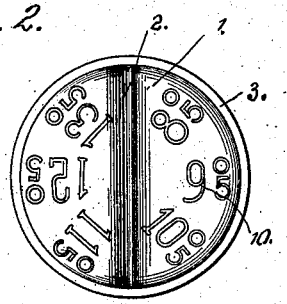
Figure 3:

Referring to the drawing forming part of this specification, like numerals of reference designate corresponding parts throughout the several views, in which:

Figure 1 is a perspective view of a bale of material having my improved tag applied thereto, Fig. 2 is a front elevation of the tag, Fig. 3 is a cross sectional view.

My improved tag is preferably constructed of metal such as tin, and comprises a convex surface 1 having a transverse groove 2 and a peripheral horizontal rim or flange 3. The tag is formed by two dies 4 and 5, the die 5 having a convex surface 6 provided with a transverse groove 7, while the die 4 is formed with a concavity 8 provided with a depending transverse rib 9 adapted to enter the groove 7 and depress the metal sufficiently to form the groove 2 of the tag.

Besides the particular formation of the tag just described, the tag is provided with a plurality of circumferentially arranged numbers, as designated by 10, the numbers in proximity to the perimeter of the tag being approximately half the size of the inner numbers, whereby the numbers can be arranged to represent various combinations. For instance, the inner numbers range from 8 to 13, and opposite each one of these numbers is printed two numbers, "0", "5". By this combination and arrangement of numbers it is possible to punch "80", "85", "90", "95" and so on to "135", these numbers representing the ordinary weights of bales in connection with which the tag may be used.

After a bale has been properly tagged and weighed, the weight of the bale is marked upon the tag by using an awl or similar instrument for punching the desired numbers. Should the bale weigh between seventy-eight and eighty-three pounds, the "0" opposite the eight is punched, and if it should weigh between eighty-three and eighty-eight pounds, the "5" opposite the "8" is punched, thus indicating that the bale weighs approximately eighty pounds, in the first instance and eighty-five in the last instance.

It is obvious that my improved tag may be used in connection with various types of baling machines, and that various means may be employed for temporarily retaining the tag in a fixed position, while the machine is being filled with hay or similar material.

Such changes in the arrangement of the numbers upon the tag and the detail construction of the tag as are permissible by the appended claims, may be resorted to without departing from the spirit and scope of the invention.

What I claim and desire to secure by Letters Patent, is:—

A tag consisting of a circular piece of material having its body portion of convex curvature and further provided with a flattened marginal portion, said body portion having its center depressed to form a groove, said groove terminating at each end in the flattened marginal portion whereby said groove is of less length than the diameter of the body portion, said body portion further provided with a plurality of numerals disposed throughout the upper face thereof.

In testimony whereof I affix my signature in the presence of two witnesses.

HENRY P. CANNON.

Witnesses:
 MAX H. SROLOVITZ,
 A. J. TRIGG.